(12) United States Patent
Jou et al.

(10) Patent No.: US 9,893,516 B2
(45) Date of Patent: Feb. 13, 2018

(54) ESD PROTECTION CIRCUITS

(71) Applicant: Vanguard International Semiconductor Corporation, Hsinchu (TW)

(72) Inventors: Yeh-Ning Jou, Hsinchu (TW); Geeng-Lih Lin, Jhudong Township (TW)

(73) Assignee: Vanguard International Semiconductor Corporation, Hsinchu (TW)

( * ) Notice: Subject to any disclaimer, the term of this patent is extended or adjusted under 35 U.S.C. 154(b) by 224 days.

(21) Appl. No.: 14/957,880

(22) Filed: Dec. 3, 2015

(65) Prior Publication Data

US 2017/0163031 A1    Jun. 8, 2017

(51) Int. Cl.
*H02H 9/04* (2006.01)

(52) U.S. Cl.
CPC ..................... *H02H 9/04* (2013.01)

(58) Field of Classification Search
CPC ............ H02H 9/04; H02H 9/041; H02H 9/046
USPC .......................................... 361/56
See application file for complete search history.

(56) References Cited

U.S. PATENT DOCUMENTS

| | | | |
|---|---|---|---|
| 6,759,691 B2 | 7/2004 | Chen | |
| 7,196,887 B2 | 3/2007 | Boselli et al. | |
| 7,911,749 B2 | 3/2011 | Lai | |
| 2008/0024946 A1* | 1/2008 | Sato | H01L 27/0251 |
| | | | 361/56 |
| 2014/0029142 A1 | 1/2014 | Ma et al. | |

FOREIGN PATENT DOCUMENTS

| | | |
|---|---|---|
| TW | 200707692 A | 2/2007 |
| TW | 201334153 A1 | 8/2013 |

* cited by examiner

*Primary Examiner* — Dharti Patel
(74) *Attorney, Agent, or Firm* — Birch, Stewart, Kolasch & Birch, LLP

(57) ABSTRACT

An ESD protection circuit, which is coupled between either an I/O pad or a power pad and a ground terminal, includes a non-snapback device and a snapback device. When the voltage across the non-snapback device is not less than the non-snapback trigger voltage, the non-snapback device is turned on. When the voltage across the snapback device is not less than the snapback trigger voltage, the snapback device is turned on, and the voltage across the snapback device is held at the snapback holding voltage, in which the snapback holding voltage is less than the snapback trigger voltage. The non-snapback device and the snapback device are cascaded.

13 Claims, 8 Drawing Sheets

ESD PROTECTION CIRCUITS

BACKGROUND OF THE INVENTION

Field of the Invention

The disclosure relates generally to ESD protection circuits, and more particularly it relates to ESD protection circuits with non-snapback devices and snapback devices that are cascaded.

Description of the Related Art

The integrated circuits can be seriously damaged by any kind of electrostatic discharge event. The main electrostatic discharge mechanism comes from the human body, which is called Human Body Model (HBM). Several amperes of peak current is generated by the human body in about 100 nanoseconds and flows to an integrated circuit, which leads to damage of the integrated circuit. The second electrostatic discharge mechanism comes from a metal object, which is called Machine Model (MM). The current generated by the Machine Model has a shorter rise time and a higher current level than that by the Human Body Model. The third mechanism is the Charged-Device Model (CDM), in which the accumulated charge in the integrated circuit is discharged to the ground in less than 0.5 nanoseconds of rise time.

However, the holding voltage of the ESD protection circuit is usually unable to be higher than the operation voltage of the integrated circuit (i.e., the supply voltage of the integrated circuit) in the high-voltage and BCD manufacturing process. It causes the ESD protection circuit to experience latchup or a latchup-like effect due to interference while the integrated circuit is working, which leads to the ESD protection circuit becoming damaged. In addition, the trigger voltage of the ESD protection circuit is often raised for the higher holding voltage, such that the ESD protection circuit is not able to perfectly protect the integrated circuit. Therefore, we need to more effectively control the holding voltage and the trigger voltage of the ESD protection circuit.

BRIEF SUMMARY OF THE INVENTION

For solving the problem described above, the invention provides an ESD protection circuit whose trigger voltage and holding voltage can be well-controlled.

An embodiment of an ESD protection circuit, which is coupled between either an I/O pad or a power pad and a ground terminal, comprises a non-snapback device and a snapback device. When the voltage across the non-snapback device is not less than the non-snapback trigger voltage, the non-snapback device is turned on. When the voltage across the snapback device is not less than the snapback trigger voltage, the snapback device is turned on, and the voltage across the snapback device is held at the snapback holding voltage, in which the snapback holding voltage is less than the snapback trigger voltage. The non-snapback device and the snapback device are cascaded.

In an embodiment, the non-snapback device is coupled to either the I/O pad or the power pad, and the snapback device is coupled between the non-snapback device and the ground terminal.

In an embodiment, when the voltage between either the I/O pad or the power pad and the ground terminal is not less than an ESD protection trigger voltage, the ESD protection circuit provides a discharging path between either the I/O pad or the power pad and the ground terminal, wherein the ESD protection trigger voltage is substantially equal to the sum of the non-snapback trigger voltage and the snapback trigger voltage.

In an embodiment, when the ESD protection circuit provides the discharging path, the voltage between either the I/O pad or the power pad and the ground terminal is held at an ESD protection holding voltage, wherein the ESD protection holding voltage is substantially equal to the sum of the non-snapback trigger voltage and the snapback holding voltage.

In an embodiment, the non-snapback device comprises a first P-type transistor, wherein a gate terminal of the first P-type transistor is coupled to a source terminal of the first P-type transistor, and the source terminal of the first P-type transistor is coupled to either the I/O pad or the power pad, wherein the first P-type transistor comprises a first trigger voltage, and the non-snapback trigger voltage is equal to the first trigger voltage.

In an embodiment, the non-snapback device further comprises a second P-type transistor, wherein a gate terminal of the second P-type transistor is coupled to a source terminal of the second P-type transistor, and the source terminal of the second P-type transistor is coupled to a drain terminal of the first P-type transistor, wherein the second P-type transistor comprises a second trigger voltage, and the non-snapback trigger voltage is substantially equal to the sum of the first trigger voltage and the second trigger voltage.

In another embodiment, the non-snapback device comprises a first PNP BJT, wherein a first resistive device is coupled between an emitter terminal of the first PNP BJT and a base terminal of the first PNP BJT, and the emitter terminal of the first PNP BJT is coupled to either the I/O pad or the power pad, wherein the first PNP BJT comprises a first trigger voltage, and the non-snapback voltage is the first trigger voltage.

In another embodiment, the non-snapback device further comprises a second PNP BJT, wherein a second resistive device is coupled between an emitter of the second PNP BJT and a base terminal of the second PNP BJT, and the emitter terminal of the second PNP BJT is coupled to a collector of the first PNP BJT, wherein the second PNP BJT comprises a second trigger voltage, and the non-snapback voltage is substantially equal to the sum of the first trigger voltage and the second trigger voltage.

In yet another embodiment, the non-snapback device comprises a P-type transistor and a PNP BJT. The gate terminal of the P-type transistor is coupled to the source terminal of the P-type transistor, and the P-type transistor comprises a first trigger voltage. A resistive device is coupled between the emitter terminal of the PNP BJT and the base terminal of the PNP BJT, and the PNP BJT comprises a second trigger voltage, in which the P-type transistor and the PNP BJT are cascaded. The non-snapback trigger voltage is substantially equal to the sum of the first trigger voltage and the second trigger voltage.

In an embodiment, the non-snapback device comprises a first N-type transistor, wherein the gate terminal of the first N-type transistor is coupled to the source terminal of the first N-type transistor, and the source terminal of the first N-type transistor is coupled to the ground terminal, wherein the first N-type comprises a first trigger voltage and a first holding voltage, wherein the snapback trigger voltage is the first trigger voltage, and the snapback holding voltage is the first holding voltage.

In an embodiment, the non-snapback device further comprises a second N-type transistor, wherein a gate terminal of the second N-type transistor is coupled to the source terminal of the second N-type transistor, and the source terminal of the second N-type transistor is coupled to the drain terminal of the first N-type transistor, wherein the second N-type transistor comprises a second trigger voltage and a second holding voltage, wherein the snapback trigger voltage is substantially equal to the sum of the first trigger voltage and the second trigger voltage, and the snapback holding voltage is substantially equal to the sum of the first holding voltage and the second holding voltage.

In another embodiment, the snapback device comprises a first NPN BJT, wherein the first resistive device is coupled between the emitter terminal of the first NPN BJT and the base terminal of the first NPN BJT, and the emitter terminal of the first NPN BJT is coupled to the ground terminal, wherein the first NPN BJT comprises a first trigger voltage and a first holding voltage, wherein the snapback voltage is the first trigger voltage, and the snapback holding voltage is the first holding voltage.

In another embodiment, the snapback device further comprises a second NPN BJT, wherein a second resistive device is coupled between an emitter terminal of the second NPN BJT and the base terminal of the second NPN BJT, and the emitter terminal of the second NPN BJT is coupled to the collector terminal of the first NPN BJT, wherein the second NPN BJT comprises a second trigger voltage and a second holding voltage, wherein the snapback trigger voltage is substantially equal to the sum of the first trigger voltage and the second trigger voltage, and the snapback holding voltage is substantially equal to the sum of the first holding voltage and the second holding voltage.

In yet another embodiment, the snapback device comprises an N-type transistor and an NPN BJT. The gate terminal of the N-type transistor is coupled to the source terminal of the N-type transistor, and the N-type transistor comprises a first trigger voltage and a first holding voltage. A resistive device is coupled between the emitter terminal of the NPN BJT and the base terminal of the NPN BJT, and the NPN BJT comprises a second trigger voltage and a second holding voltage, in which the N-type transistor and the NPN BJT are cascaded. The snapback trigger voltage is substantially equal to the sum of the first trigger voltage and the second trigger voltage, and the snapback holding voltage is substantially equal to the sum of the first holding voltage and the second holding voltage.

Another embodiment of an ESD protection circuit, which is coupled between either an I/O pad or a power pad and a ground terminal, comprises a plurality of non-snapback devices and a plurality of snapback devices. When the voltage across each of the non-snapback devices is not less than the non-snapback trigger voltage, the non-snapback devices are turned on. When the voltage across each of the snapback devices is not less than the snapback trigger voltage, the snapback devices are turned on, and the voltage across each of the snapback device is held at the snapback holding voltage, in which the snapback holding voltage is less than the snapback trigger voltage. The non-snapback device and the snapback devices are cascaded.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
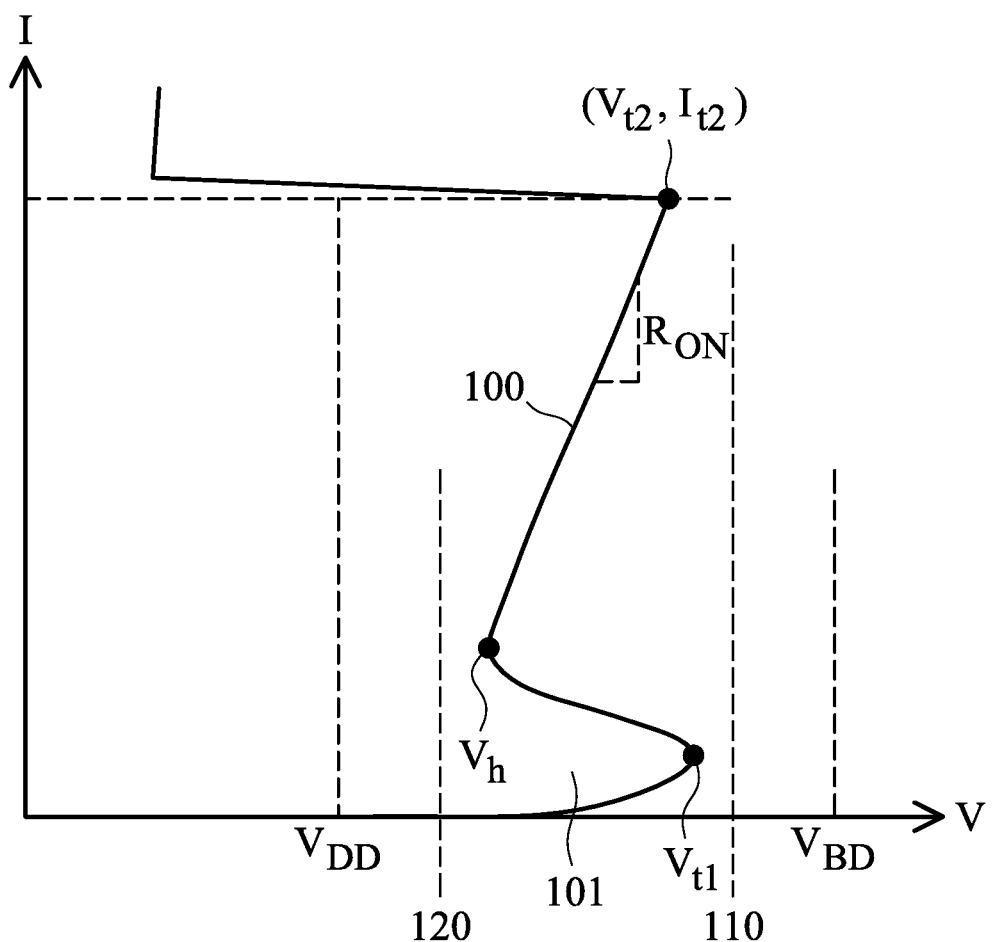
FIG. 1 is a Transmission Line Pulsing (TLP) voltage-to-current curve of an ESD protection circuit in accordance with an embodiment of the invention.

FIG. 1 is a transmission line pulse (TLP) voltage-to-current curve of an ESD protection circuit in accordance with an embodiment of the invention. As shown in FIG. 1, the ESD protection trigger voltage $V_{t1}$ and the ESD protection holding voltage $V_h$ in the TLP curve 100 of an ideal ESD protection circuit are placed in the ESD design region 101. The upper boundary 110 of the ESD design region 101 is less than the breakdown voltage $V_{BD}$ of the protected integrated circuit, and the lower boundary 120 exceeds the operation voltage $V_{DD}$ of the protected integrated circuit.

Once the TLP curve 100 is placed in the ESD design region 101, the ESD protection trigger voltage $V_{t1}$ is less than the protected breakdown voltage VBD of the protected integrated circuit, which makes sure to provide ESD protection for the integrated circuit. The ESD protection holding voltage $V_h$ exceeds the operation voltage $V_{DD}$ of the protected integrated circuit, such that the ESD protection circuit is prevented from being damaged by latchup or a latchup-like effect. According to an embodiment of the invention, the ESD protection trigger voltage $V_{t1}$ is about 3~5V less than the breakdown voltage $V_{BD}$, and the ESD protection holding voltage $V_h$ exceeds the operation voltage $V_{DD}$ by about 3~5V.

The turn-on resistance $R_{ON}$ of the ESD protection circuit is configured to maintain the second breakdown voltage $V_{t2}$ less than the upper boundary 110, which makes sure that the second breakdown voltage $V_{t2}$ is less than the breakdown voltage $V_{BD}$ for providing ESD protection to the integrated circuit. The second breakdown current $I_{t2}$ is determined according to the requirements of ESD protection. According to an embodiment of the invention, the second breakdown voltage $V_{t2}$ is about 3~5V less than the breakdown voltage $V_{BD}$.

Figure 2:
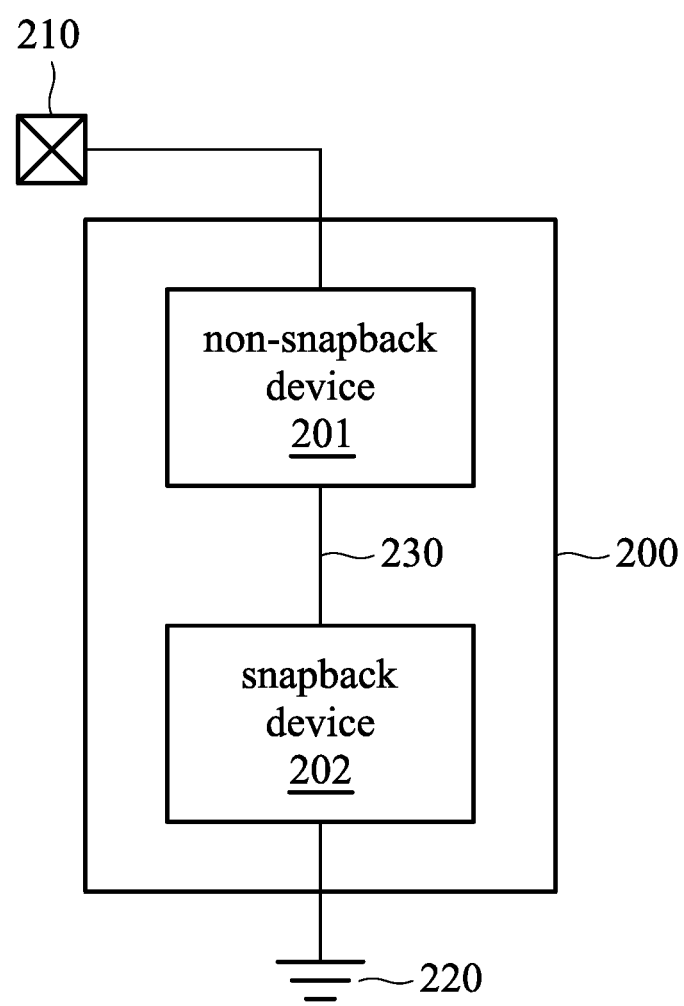
FIG. 2 is a block diagram of an ESD protection circuit in accordance with an embodiment of the invention.
Figure 3A:
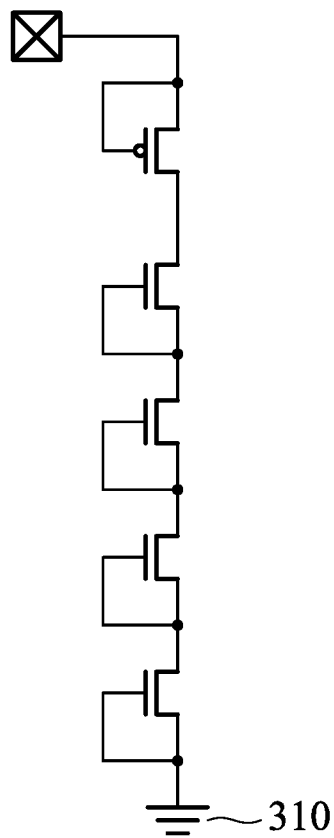
FIGS. 3A-3D show schematic diagrams of ESD protection circuits in accordance with a plurality of embodiments of the invention.
Figure 3B:
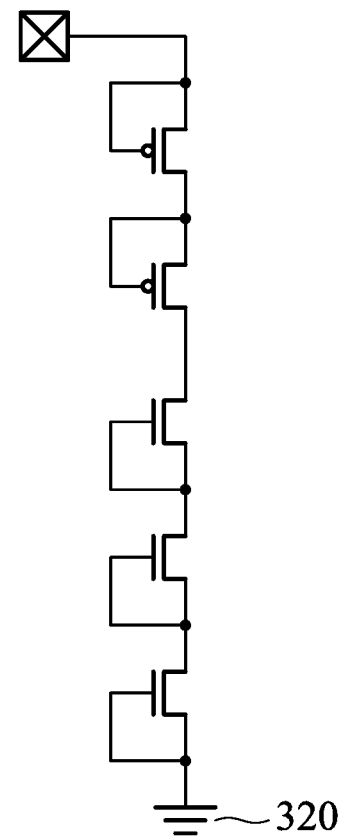
Figure 3C:
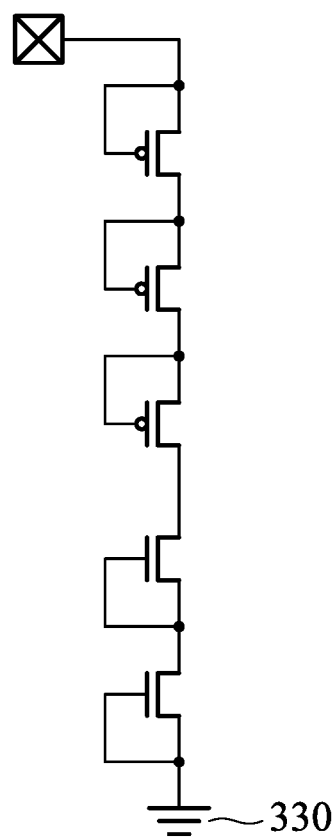
Figure 3D:
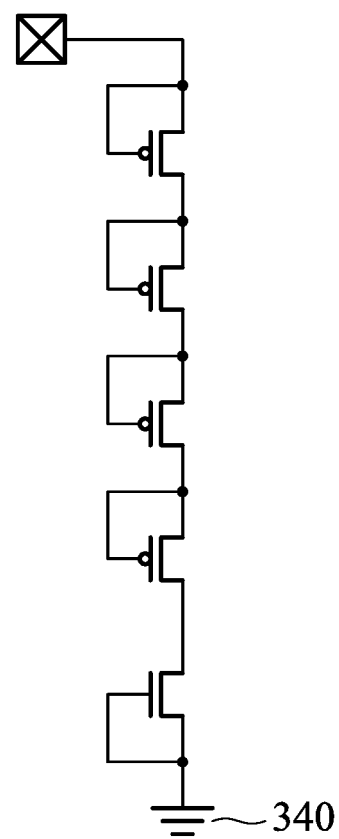

FIG. 2 is a block diagram of an ESD protection circuit in accordance with an embodiment of the invention. As shown in FIG. 2, the ESD protection circuit 200 is coupled between the pad 210 and the ground terminal 220. According to an embodiment of the invention, the pad 210 is an I/O pad. According to another embodiment of the invention, the pad 210 is a power pad which receives the operation voltage of the integrated circuit.

The ESD protection circuit 220 includes the non-snapback device 201 and the snapback device 202. The non-snapback device 201 is coupled between the pad 210 and the first node 230. When the voltage across the non-snapback device 201 is not less than the non-snapback trigger voltage (i.e., the voltage between the pad 210 and the first node 230 is not less than the non-snapback trigger voltage of the non-snapback device 201), the non-snapback device 210 is turned on.

The snapback device 202 is coupled between the first node 230 and the ground terminal 220. When the voltage across the snapback device 202 is not less than the snapback trigger voltage (i.e., the voltage between the first node 230 and the ground terminal 220 is not less than the snapback trigger voltage of the snapback device 202), the snapback device 202 is turned on, and the voltage across the snapback device 202 is then held at the snapback holding voltage, in which the snapback holding voltage is less than the snapback trigger voltage.

According to an embodiment of the invention, when the voltage between the pad 210 and the ground terminal 220 is not less than the ESD protection trigger voltage (i.e., corresponding to the ESD protection trigger voltage $V_{t1}$ in FIG. 1), the ESD protection circuit 200 provides a discharging path between the pad 210 and the ground terminal 220, in which the ESD protection trigger voltage is substantially equal to the sum of the non-snapback trigger voltage and the snapback trigger voltage.

According to an embodiment of the invention, when the ESD protection circuit 200 provides a discharging path between the pad 210 and the ground terminal 220, the voltage between the pad 210 and the ground terminal 220 is held at the ESD protection holding voltage (i.e., corresponding to the ESD protection holding voltage $V_h$ in FIG. 1), in which the ESD protection holding voltage is substantially equal to the sum of the non-snapback holding voltage and the snapback holding voltage. The non-snapback device 201 and the snapback device 202 will be described in detail in the following description.

According to an embodiment of the invention, since P-type transistors and PNP bipolar junction transistors are not snapped back during breakdown, the non-snapback device 201 is formed by one or a plurality of cascaded gate-source-connected P-type transistors, one or a plurality of cascaded PNP BJTs whose emitter terminal is coupled to its base terminal through a resistive device, or an arbitrary number of cascaded gate-source-connected P-type transistors and an arbitrary number of cascaded PNP BJTs whose emitter terminal is coupled to its base terminal through a resistive device.

According to an embodiment of the invention, since N-type transistors and NPN BJTs are snapped back during breakdown, the snapback device 202 is formed by one or a plurality of cascaded gate-source-connected N-type transistors, one or a plurality of cascaded NPN BJTs whose emitter terminal is coupled to its base terminal through a resistive device, or an arbitrary number of cascaded gate-source-connected N-type transistors and an arbitrary number of cascaded NPN BJTs whose emitter terminal is coupled to its base terminal through a resistive device.

FIGS. 3A-3D show schematic diagrams of ESD protection circuits in accordance with a plurality of embodiments of the invention. As shown in FIGS. 3A-3D, the first ESD protection circuit 310, the second ESD protection circuit 320, the third ESD protection circuit 330, and the fourth ESD protection circuit 340 are formed by cascaded gate-source-connected N-type and P-type transistors (i.e., GGNMOS and GDPMOS) which are devices normally-operated with 5V operation voltage, in which the N-type transistors belong to the snapback device, and the P-type transistors belong to the non-snapback device.

The first ESD protection circuit 310 is formed by one GDPMOS and four GGNMOSs that are cascaded, the second ESD protection circuit 320 is formed by two GDPMOSs and three GGNMOSs that are cascaded, the third ESD protection circuit 330 is formed by three GDPMOSs and two GGNMOSs that are cascaded, and the fourth ESD protection circuit 340 is formed by four GDPMOSs and one GGNMOS that are cascaded. According to an embodiment of the invention, the PMOS trigger voltage $V_{t1\_PMOS}$ of GDPMOS is 11V, the NMOS trigger voltage $V_{t1\_NMOS}$ of GGNMOS is 10V, and the N-type transistor holding voltage $V_{h\text{-}NMOS}$ is 7V.

Figure 4:
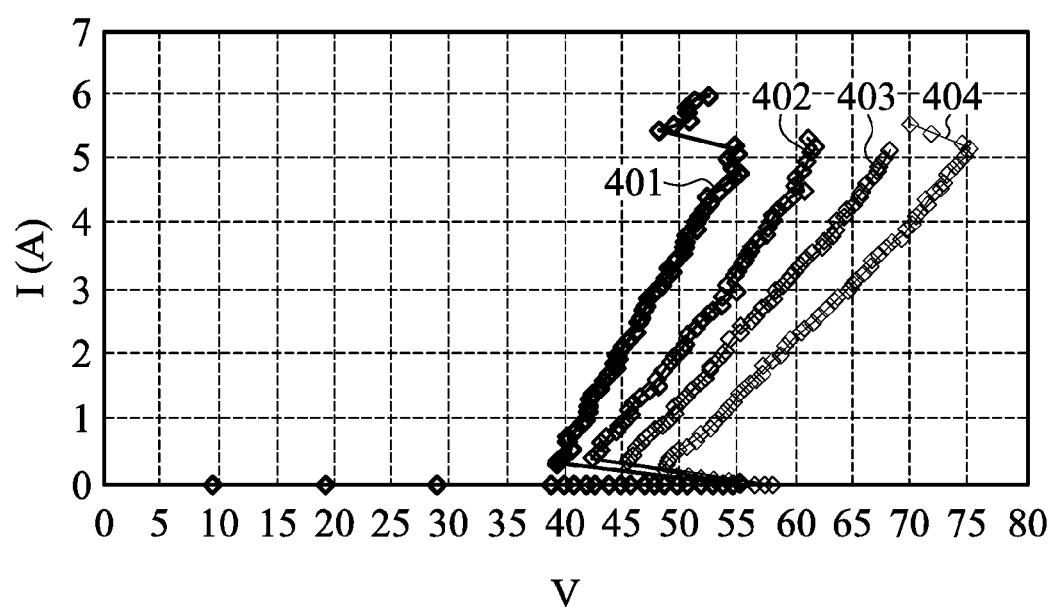
FIG. 4 shows TLP voltage-to-current curves corresponding to the ESD protection circuits in FIGS. 3A-3D in accordance with some embodiments of the invention.

FIG. 4 shows TLP voltage-to-current curves corresponding to the ESD protection circuits in FIGS. 3A-3D in accordance with some embodiments of the invention. As shown in FIG. 4, the first TLP curve 401, the second TLP curve 402, the third TLP curve 403, and the fourth TLP curve 404 respectively correspond to the first ESD protection circuit 310, the second ESD protection circuit 320, the third ESD protection circuit 330, and the fourth ESD protection circuit 340, which are actually measured by a TLP system.

According to the TLP voltage-to-current curve shown in FIG. 4, Table 1 lists the breakdown voltage $V_{BD}$, the ESD protection trigger voltage $V_{t1}$, and the ESD protection holding voltage $V_h$ of the first ESD protection circuit 310, the second ESD protection circuit 320, the third ESD protection circuit 330, and the fourth ESD protection circuit 340.

TABLE 1

| ESD protection circuit | $V_{BD}$ (V) | $V_{t1}$ (V) | $V_h$ (V) |
| --- | --- | --- | --- |
| 310 | 52.8 | 51.5 | 39.2 |
| 320 | 52.8 | 57.1 | 42.4 |
| 330 | 52.6 | 57.8 | 45.8 |
| 340 | 51.8 | 55.6 | 45.8 |

As shown in Table 1, the breakdown voltage $V_{BD}$ of the first ESD protection circuit 310, the second ESD protection circuit 320, the third ESD protection circuit 330, and the fourth ESD protection circuit 340 are substantially identical, which means that the breakdown voltage of N-type transistors is very close to that of P-type transistors. In addition, the ESD protection trigger voltage $V_{t1}$ and the ESD protection holding voltage $V_h$ of the first ESD protection circuit 310, the second ESD protection circuit 320, the third ESD protection circuit 330, and the fourth ESD protection circuit 340 can be estimated by the PMOS trigger voltage $V_{t1\_PMOS}$, the NMOS trigger voltage $V_{t1\_NMOS}$, and the NMOS holding voltage $V_{h\_NMOS}$. The method for estimating the ESD protection trigger voltage $V_{t1}$ and the ESD protection holding voltage $V_h$ will be introduced in the following description.

Since the first ESD protection circuit 310 is formed by one GDPMOS and four GGNMOSs that are cascaded, the ESD protection trigger voltage $V_{t1}$ of the first ESD protection circuit 310 can be estimated by filling the PMOS trigger voltage $V_{t1\_PMOS}$, the number of PMOS $N_{PMOS}$, the NMOS trigger voltage $V_{t1\_NMOS}$, and the number of NMOS $N_{NMOS}$ into Eq. 1, which is $V_{t1}=1\times 11+4\times 10=51$ V.

$$V_{t1}=N_{PMOS}\times V_{t1\_PMOS}+N_{NMOS}\times V_{t1\_NMOS} \quad (Eq. 1)$$

Referring to Table 1, the actual ESD protection trigger voltage $V_{t1}$ of the first ESD protection circuit 310 is 51.5V as shown in Table 1. That is, the estimation value is very close to the actual measured value. According to the method stated above, the ESD protection trigger voltage $V_{t1}$ of the second ESD protection circuit 320, the third ESD protection circuit 330, and the fourth ESD protection circuit 340 can be estimated by Eq. 1, which is 52V, 53V, and 54V respectively. However, the actual ESD protection trigger voltage $V_{t1}$ of the second ESD protection circuit 320, the third ESD protection circuit 330, and the fourth ESD protection circuit 340 shown in Table 1 are 57.1V, 57.8, and 55.6V, respectively.

It should be understood that the estimation value of the ESD protection trigger voltage Vt1 by Eq. 1 is substantially equal to the actual ESD protection trigger voltage $V_{t1}$ measured by a TLP system, and the maximum estimation error is 8.9%. Therefore, the designer of the ESD protection circuit is able to determine, according to the estimation value by Eq. 1, whether the ESD protection trigger voltage $V_{t1}$ of the designed ESD protection circuit is placed in the ESD design region 101 shown in FIG. 1.

Likewise, the ESD protection holding voltage $V_h$ of the first ESD protection circuit 310, the second ESD protection circuit 320, the third ESD protection circuit 330, and the fourth ESD protection circuit 340 can be estimated by filling the PMOS trigger voltage $V_{t1\_PMOS}$, the number of PMOS $N_{PMOS}$, the NMOS holding voltage $V_{h\_NMOS}$, and the number of NMOS $N_{NMOS}$ into Eq. 2.

$$V_h=N_{PMOS}\times V_{t1\_PMOS}+N_{NMOS}\times V_{h\_NMOS} \quad (Eq. 2)$$

The ESD protection holding voltage $V_h$ of the first ESD protection circuit 310, the second ESD protection circuit 320, the third ESD protection circuit 330, and the fourth ESD protection circuit 340 estimated by Eq. 2 are 39V, 43V, 47V, and 51V, respectively. However, the actual ESD protection holding voltage $V_h$, which are obtained by measurement, are 39.2V, 42.4V, 45.8V, and 48.8V, respectively. Therefore, the ESD protection holding voltage $V_h$ of the ESD protection circuit can be estimated by Eq. 2, and the maximum error is 4.5%.

Figure 5:
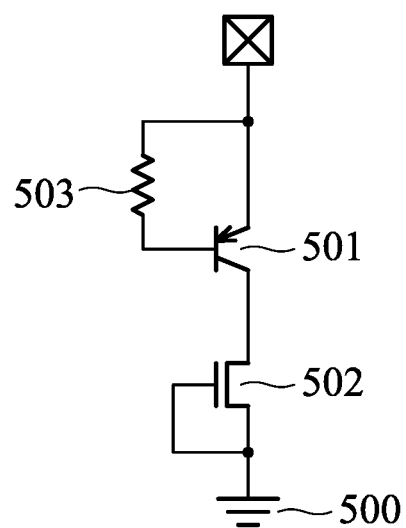
FIG. 5 is a schematic diagram of an ESD protection circuit in accordance with another embodiment of the invention.

FIG. 5 is a schematic diagram of an ESD protection circuit in accordance with another embodiment of the invention. As shown in FIG. 5, the ESD protection circuit 500 includes the PNP BJT 501, in which the emitter terminal of the PNP BJT 501 is coupled to the base terminal of the PNP BJT 501 through the resistive device 503, and the gate-source-connected N-type transistor 502.

Since the PNP BJT 501 is not snapped back during breakdown, the PNP BJT 501 belongs to the non-snapback device. However, the N-type transistor 502 belongs to the snapback device. According to an embodiment of the invention, the PNP BJT trigger voltage $V_{t1\_PNP}$ of the PNP BJT 501 is 40V, and the NMOS trigger voltage $V_{t1\_NMOS}$ of the N-type transistor 502 is 11V, such that the NMOS holding voltage $V_{h\_NMOS}$ of the N-type transistor 502 is 7V.

Figure 7:
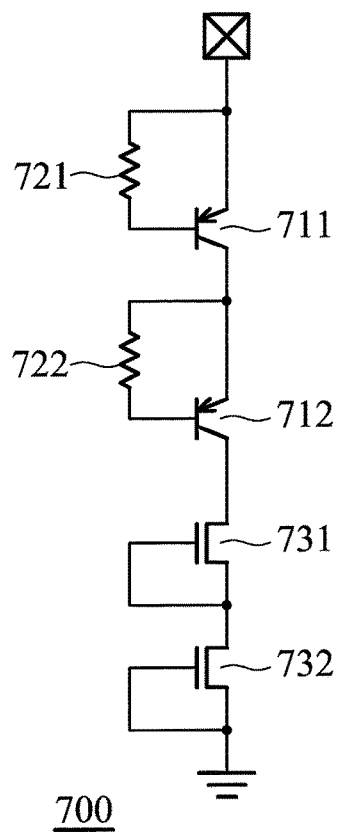
FIG. 7 is a schematic diagram of an ESD protection circuit in accordance with yet another embodiment of the invention.

FIG. 7 is a schematic diagram of an ESD protection circuit in accordance with yet another embodiment of the invention. As shown in FIG. 7, the ESD protection circuit 700 includes the first PNP BJT 711, the second PNP BJT 712, the first gate-source-connected N-type transistor 731, and the second gate-source-connected N-type transistor 732, in which the emitter terminal of the first PNP BJT 711 is coupled to the base terminal of the first PNP BJT 711 through the first resistive device 721 and the emitter terminal of the second PNP BJT 712 is coupled to the base terminal of the second PNP BJT 712 through the second resistive device 722.

Figure 8:
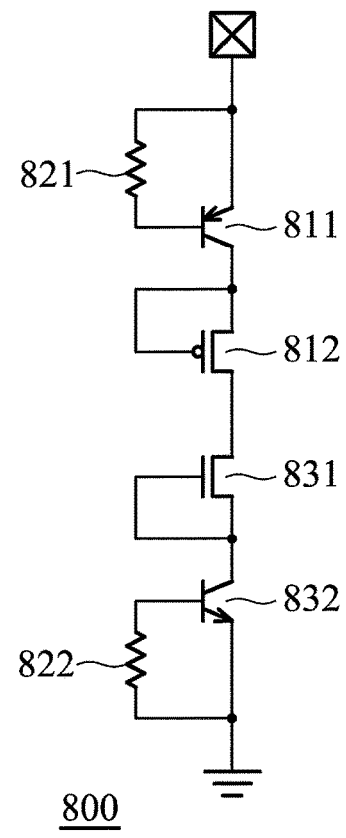
FIG. 8 is a schematic diagram of an ESD protection circuit in accordance with yet another embodiment of the invention.

FIG. 8 is a schematic diagram of an ESD protection circuit in accordance with yet another embodiment of the invention. As shown in FIG. 8, the ESD protection circuit 800 includes the PNP BJT 811, the gate-source-connected P-type transistor 812, the gate-source-connected N-type transistor 831, and the NPN BJT 832, in which the emitter terminal of the PNP BJT 811 is coupled to the base terminal of the PNP BJT 811 through the first resistive device 821 and the emitter terminal of the NPN BJT 832 is coupled to the base terminal of the NPN BJT 832 through the second resistive device 822.

Figure 6:
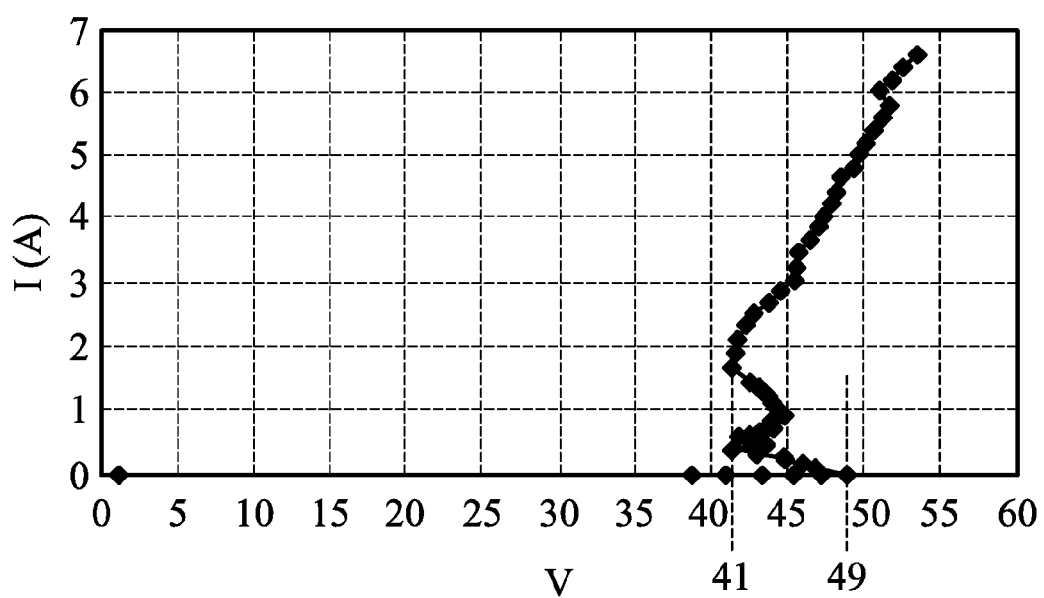
FIG. 6 is a TLP voltage-to-current curve corresponding to the ESD protection circuit in FIG. 5 in accordance with an embodiment of the invention.

FIG. 6 is a TLP voltage-to-current curve corresponding to the ESD protection circuit in FIG. 5 in accordance with an embodiment of the invention. As shown in FIG. 6, the measurement value of the ESD protection trigger voltage $V_{t1}$ of the ESD protection circuit 500 is 49V, and the measurement value of the ESD protection holding voltage $V_h$ is 41V.

However, the ESD protection trigger voltage $V_{t1}$ of the ESD protection circuit 500 can be estimated by the sum of the PNP BJT trigger voltage $V_{t1\_PNP}$ and the NMOS trigger voltage $V_{t1\_NMOS}$, which is $V_{t1}=V_{t1\_PNP}+V_{h\_NMOS}=40+7=47$ V.

Therefore, the invention provides an ESD protection circuit with the snapback devices and the non-snapback devices being cascaded. The designer is able to design the required ESD protection trigger voltage $V_{t1}$ and the required ESD protection holding voltage $V_h$ by cascading the snapback devices and the non-snapback devices. In addition, the ESD protection trigger voltage $V_{t1}$ and the ESD protection holding voltage $V_h$ can be estimated by equations to get estimation values which are fairly close to the actual ones. Therefore, it is more convenient for the designer to determine whether the ESD protection trigger voltage $V_{t1}$ and the ESD protection holding voltage $V_h$ of the designed ESD protection circuit have sufficient ESD protection capability.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. An ESD protection circuit, coupled between either an I/O pad or a power pad and a ground terminal, comprising:
   a non-snapback device, wherein when a voltage across the non-snapback device is not less than a non-snapback trigger voltage, the non-snapback device is turned on; and
   a snapback device, wherein when voltage across the snapback device is not less than a snapback trigger voltage, the snapback device is turned on, and the voltage across the snapback device is held at a snapback holding voltage, wherein the snapback holding voltage is less than the snapback trigger voltage, wherein the non-snapback device and the snapback device are cascaded, wherein the non-snapback device is coupled to either the I/O pad or the power pad, and the snapback device is coupled between the non-snapback device and the ground terminal, wherein when voltage between either the I/O pad or the power pad and the ground terminal is not less than an ESD protection trigger voltage, the ESD protection circuit provides a discharging path between either the I/O pad or the power pad and the ground terminal, wherein the ESD protection trigger voltage is substantially equal to a sum of the non-snapback trigger voltage and the snapback trigger voltage.

2. The ESD protection circuit of claim 1, wherein when the ESD protection circuit provides the discharging path, the voltage between either the I/O pad or the power pad and the ground terminal is held at an ESD protection holding voltage, wherein the ESD protection holding voltage is substantially equal to a sum of the non-snapback trigger voltage and the snapback holding voltage.

3. The ESD protection circuit of claim 1, wherein the non-snapback device comprises a first P-type transistor, wherein a gate terminal of the first P-type transistor is coupled to a source terminal of the first P-type transistor, and the source terminal of the first P-type transistor is coupled to either the I/O pad or the power pad, wherein the first P-type transistor comprises a first trigger voltage, and the non-snapback trigger voltage is equal to the first trigger voltage.

4. The ESD protection circuit of claim 3, wherein the non-snapback device further comprises a second P-type transistor, wherein a gate terminal of the second P-type transistor is coupled to a source terminal of the second P-type transistor, and the source terminal of the second P-type transistor is coupled to a drain terminal of the first P-type transistor, wherein the second P-type transistor comprises a second trigger voltage, and the non-snapback trigger voltage is substantially equal to a sum of the first trigger voltage and the second trigger voltage.

5. The ESD protection circuit of claim 1, wherein the non-snapback device comprises a first PNP BJT, wherein a first resistive device is coupled between an emitter terminal of the first PNP BJT and a base terminal of the first PNP BJT, and the emitter terminal of the first PNP BJT is coupled to either the I/O pad or the power pad, wherein the first PNP BJT comprises a first trigger voltage, and the non-snapback voltage is the first trigger voltage.

6. The ESD protection circuit of claim 1, wherein the non-snapback device comprises:
 a P-type transistor, wherein a gate terminal of the P-type transistor is coupled to a source terminal of the P-type transistor, and the P-type transistor comprises a first trigger voltage; and
 a PNP BJT, wherein a resistive device is coupled between an emitter terminal of the PNP BJT and a base terminal of the PNP BJT, and the PNP BJT comprises a second trigger voltage, wherein the P-type transistor and the PNP BJT are cascaded, wherein the non-snapback trigger voltage is substantially equal to a sum of the first trigger voltage and the second trigger voltage.

7. The data retrieval method as claimed in claim 6, wherein the step of retrieving the data of the first physical page of the first memory plane and the data of the second physical page of the second memory plane in response to the read command further comprises:
 sequentially transmitting a plurality of chunk read commands to the flash memory according to the read command to sequentially retrieve a plurality chunks of the target page which is constituted by the first physical page and the second physical page, wherein two of the chunk read commands are respectively arranged to retrieve a plurality bytes of the first physical page and a plurality bytes of the second physical page to obtain a first chunk of the chunks.

8. The ESD protection circuit of claim 1, wherein the snapback device comprises a first N-type transistor, wherein a gate terminal of the first N-type transistor is coupled to a source terminal of the first N-type transistor, and the source terminal of the first N-type transistor is coupled to the ground terminal, wherein the first N-type comprises a first trigger voltage and a first holding voltage, wherein the snapback trigger voltage is the first trigger voltage, and the snapback holding voltage is the first holding voltage.

9. The ESD protection circuit of claim 8, wherein the snapback device further comprises a second N-type transistor, wherein a gate terminal of the second N-type transistor is coupled to a source terminal of the second N-type transistor, and the source terminal of the second N-type transistor is coupled to a drain terminal of the first N-type transistor, wherein the second N-type transistor comprises a second trigger voltage and a second holding voltage, wherein the snapback trigger voltage is substantially equal to a sum of the first trigger voltage and the second trigger voltage, and the snapback holding voltage is substantially equal to a sum of the first holding voltage and the second holding voltage.

10. The ESD protection circuit of claim 1, wherein the snapback device comprises a first NPN BJT, wherein a first resistive device is coupled between an emitter terminal of the first NPN BJT and a base terminal of the first NPN BJT, and the emitter terminal of the first NPN BJT is coupled to the ground terminal, wherein the first NPN BJT comprises a first trigger voltage and a first holding voltage, wherein the snapback voltage is the first trigger voltage, and the snapback holding voltage is the first holding voltage.

11. The ESD protection circuit of claim 10, wherein the snapback device further comprises a second NPN BJT, wherein a second resistive device is coupled between an emitter terminal of the second NPN BJT and a base terminal of the second NPN BJT, and the emitter terminal of the second NPN BJT is coupled to a collector terminal of the first NPN BJT, wherein the second NPN BJT comprises a second trigger voltage and a second holding voltage, wherein the snapback trigger voltage is substantially equal to a sum of the first trigger voltage and the second trigger voltage, and the snapback holding voltage is substantially equal to a sum of the first holding voltage and the second holding voltage.

12. The ESD protection circuit of claim 1, wherein the snapback device comprises:
 an N-type transistor, wherein a gate terminal of the N-type transistor is coupled to a source terminal of the N-type transistor, and the N-type transistor comprises a first trigger voltage and a first holding voltage; and
 an NPN BJT, wherein a resistive device is coupled between an emitter terminal of the NPN BJT and a base terminal of the NPN BJT, and the NPN BJT comprises a second trigger voltage and a second holding voltage, wherein the N-type transistor and the NPN BJT are cascaded, wherein the snapback trigger voltage is substantially equal to a sum of the first trigger voltage and the second trigger voltage, and the snapback holding voltage is substantially equal to a sum of the first holding voltage and the second holding voltage.

13. An ESD protection circuit, coupled between either an I/O pad or a power pad and a ground terminal, comprising:
- a plurality of non-snapback devices, wherein when voltage across each of the non-snapback devices is not less than a non-snapback trigger voltage, the non-snapback devices are turned on; and
- a plurality of snapback devices, wherein when voltage across each of the snapback devices is not less than a snapback trigger voltage, the snapback devices are turned on, and the voltage across each of the snapback device is held at a snapback holding voltage, wherein the snapback holding voltage is less than the snapback trigger voltage, wherein the non-snapback device and the snapback devices are cascaded.

* * * * *